United States Patent [19]

Kartanson

[11] 4,163,684
[45] Aug. 7, 1979

[54] METHOD AND APPARATUS FOR STRIP LAMINATING

[75] Inventor: John M. Kartanson, Winston-Salem, N.C.

[73] Assignee: RJR Archer, Inc., Winston-Salem, N.C.

[21] Appl. No.: 873,028

[22] Filed: Jan. 27, 1978

[51] Int. Cl.² ............................................. B32B 31/00
[52] U.S. Cl. ................................. 156/259; 156/271; 156/519
[58] Field of Search ............... 156/259, 271, 519, 510, 156/264

[56] References Cited

U.S. PATENT DOCUMENTS

| 452,109 | 5/1891 | Maloney | 156/231 |
|---|---|---|---|
| 1,610,134 | 12/1926 | Jones | 156/271 |
| 1,690,514 | 11/1928 | Walter et al. | 156/231 |
| 1,763,227 | 6/1930 | Elmendorf | 156/231 |
| 2,250,533 | 7/1941 | Hanson | 156/259 |
| 2,289,336 | 7/1942 | Bamford | 156/519 |
| 2,303,346 | 12/1942 | Flood | 156/259 |
| 2,310,851 | 2/1943 | Haren et al. | 156/231 |
| 3,080,270 | 3/1963 | Lorenz | 156/233 |
| 3,240,647 | 3/1966 | Morgan | 156/249 |
| 3,329,547 | 7/1967 | Denenberg | 156/247 |
| 3,458,376 | 7/1969 | Malik | 156/233 |
| 3,620,872 | 11/1971 | Backwell | 156/231 |
| 3,660,190 | 5/1972 | Stroszynski | 156/231 |
| 3,713,939 | 1/1973 | Preg | 156/248 |
| 3,919,032 | 11/1975 | Greenbarg | 156/252 |

Primary Examiner—Douglas J. Drummond
Attorney, Agent, or Firm—Grover M. Myers

[57] ABSTRACT

A strip laminating method in which a first web is moved into contact with an anvil surface, severed into a plurality of strips and maintained in contact with said anvil surface. A second web having a selected striped adhesive pattern is moved into contact with said anvil surface and selected strip of said first web adheres to the adhesive stripes on said second web.

10 Claims, 3 Drawing Figures

METHOD AND APPARATUS FOR STRIP LAMINATING

BACKGROUND OF THE INVENTION

This invention relates to a method and apparatus for laminating strips of thin or light gauge material to a backing material or substrate, and more particularly to laminating spaced narrow foil strips to a paper web.

In the packaging art, there are many containers for products which use liners consisting of a foil and paper laminant which are used to wrap the contents of a container. Excellent examples of this type of product container are the cigarette package and the candy wrapper. The cigarette package is primarily a paper foil liner surrounded by a label.

Processes for laminating foil to the paper are well known in the art. The liner used for cigarette packages is manually made by providing a foil web approximately 0.00025" in thickness and a paper web to which an adhesive is applied. The foil and paper are laminated together to form a composite web which is then slit into the proper width for use in the cigarette packages.

The foil used in the composite liner material was originally used in a moisture barrier; however, it has been found that the loss of moisture is not a significant problem in cigarette packages and, therefore, the foil laminant is not needed. The consuming public has, however, come to accept the foil barrier as being necessary and eliminating the foil from the cigarette liner would be quite detrimental when marketing the product.

For this reason, efforts have been made to laminate narrow foil strips on a wide paper web and use this strip laminated composite sheet for the cigarette package liner. There are two advantages to strip laminating. First, cigarette packages retain their present appearance with foil exposed on the ends of the package; and, secondly, there is a reduction in the amount of foil required, thereby reducing the cost of the packaging material and conserving our resources.

The use of stripped packaging material is not new in the cigarette packaging art; in fact, in 1891, T. J. Maloney obtained U.S. Pat. No. 452,109 on this concept. Prior to the present invention, there has been one way to laminate narrow strips of foil on a wide paper web. In this operation, a plurality of spaced rolls of a narrow foil stripping is unwound and nipped to a wide paper web having a striped adhesive pattern.

The strip lining material illustrated in U.S. Pat. No. 452,109 has not been used widely in cigarette packaging mainly because the greater expense and lesser efficiency of the previously known strip laminating method cannot be justified. Today, however, with conservation of resources becoming more and more important, strip laminating materials have become more and more attractive as packaging materials. Nevertheless, the presently known strip laminating techniques described above produce a multitude of problems and expenses. For example, the slitting operation for the foil to produce the narrow width rolls of light gauge foil is quite expensive. The handling of the increased number of small rolls of foil increases the possibility of damage to the foil which of course affects the scrap rate. But, the most critical problem concerns the delicate nature of the narrow thin gauge foil and maintaining the proper tension on all of the narrow webs. Foil webs, like webs of most other material, vary in thickness in the longitudinal machine direction as well as the transverse direction. This variance in thickness of the web makes it difficult to maintain the proper tension in the web so that you might get taunt webs next to slack webs.

Another problem is maintaining parallelism of all of the foil rolls. If parallelism is not maintained, tension on one edge of the foil can become greater than on the other edge. If all of the tension forces are directed to one edge of the foil, the edge will tear and the tear will progress across the web, causing a web breakage and machine downtime.

My strip laminating method overcomes most of the problems inherent in the multi-roll approach used and reduces others to a level where they become manageable.

SUMMARY OF THE INVENTION

It is, therefore, an object of this invention to provide a strip laminating process and apparatus which would eliminate the necessity of having a separate slitting operation, thereby reducing the handling of multiple narrow rolls.

Another object of this invention is to provide a strip laminating process which will reduce the problems caused by a variation in the tension on the narrow webs.

Still another object of this invention is to provide a strip laminating process which eliminates the parallelism problem encountered when using multiple rolls.

These and other objects are accomplished by the present invention which is a strip laminating process in that a first web is directed onto a ledger or anvil. The first web is slit into strips while on the anvil and selected strips are picked up from the anvil at various locations by other webs having selected striped adhesive patterns. The strips of the first web are maintained in contact with the anvil surface between slitting and pickup locations.

BRIEF DESCRIPTION OF THE DRAWINGS

The foregoing and additional objects, features and advantages of the invention will be apparent to those skilled in the art from the following detailed description of a preferred embodiment taken with the accompanying drawings, in which.

DESCRIPTION OF A PREFERRED EMBODIMENT

Figure 1:
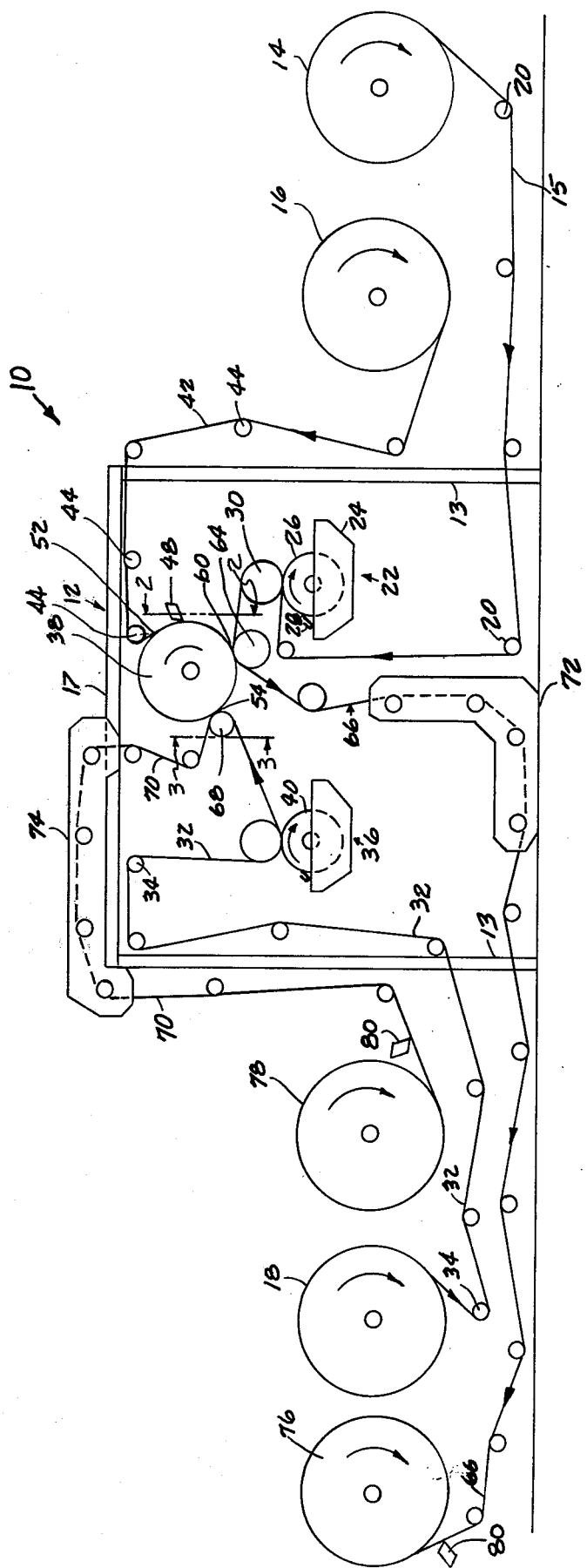
FIG. 1 is a diagramatic elevation view of a strip laminator apparatus utilizing the process of the present invention.
Figure 2:
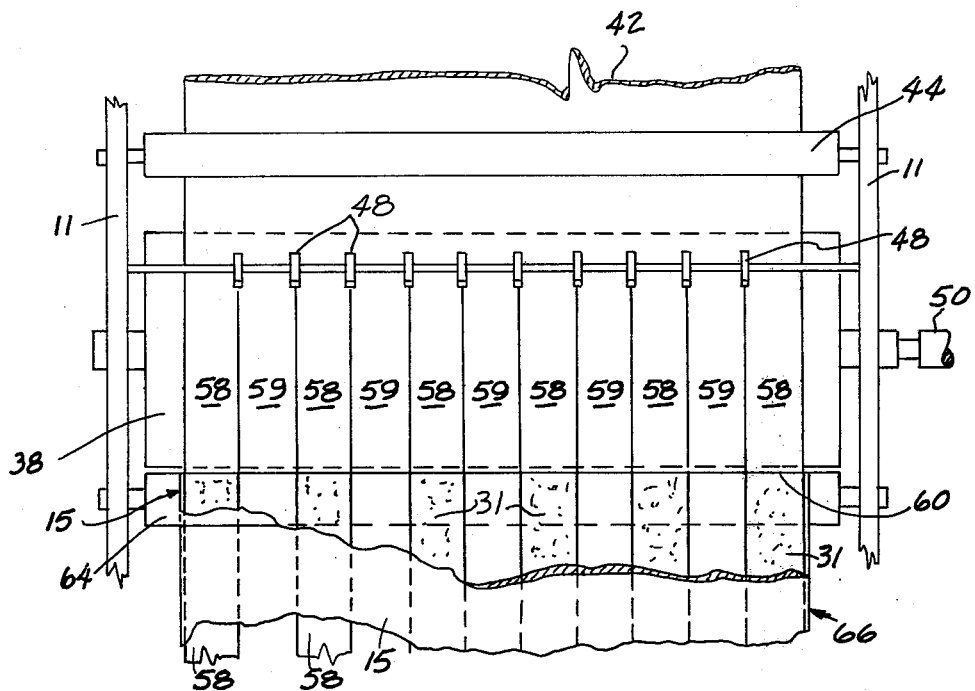
FIG. 2 is a sectional view taken along Line 2—2 of FIG. 1.

Referring more particularly to the drawings, in FIG. 1, the numeral 10 indicates a strip laminating apparatus according to the present invention. It should be understood that only one embodiment of the strip laminator is shown, and there are a number of modifications as to the unwind and re-wind systems of the web which can be used. Any changes in these systems would necessitate change in the location of various other elements on the strip laminator. The elements of the strip laminator are carried on a frame 12 which is shown in FIG. 1 as two upright members 13 and a horizontal top member 17. The various rollers which are illustrated in FIG. 1 are suitably journaled and carried in side pieces 11 (see FIG. 2) which are not shown in FIG. 1 for clarity. The structural arrangement of the frame and the supports can be varied and it is within the skill of the art.

The strip laminator 10 has three in-feed rolls 14, 16 and 18. The in-feed rolls 14 and 18 supply one substrate or carrier web for the composite web made by the process, such as paper, plastic, film or the like. The cigarette package liner described above utilizes a paper web and, for convenience, the remainder of this description will refer to rolls 14 and 18 as in-feed paper rolls. The other in-feed roll 16 will be of any material, such as foil, plastic film, etc., since the system can be utilized to strip laminate almost any type of materials. But, the primary purpose of this strip laminator is to laminate strips of a light gauge foil, approximately 0.00025 inches, to a backing web such as paper. For this reason, the infeed roll 16 will be referred to hereinafter as an in-feed foil roll.

The paper web 15 from roller 14 is threaded through a pattern of positioned idler rollers 20 which direct and move the web to an adhesive application station 22. Adhesive application station has a trough or pan 24 which carries a supply of a suitable adhesive as is known in the art. An applicator roller 26, such as gravure cylinder having alternating smooth and etched circumferential bands as is known in the art, is positioned partially within the pan so that the lower portion of the cylinder passes through the adhesive as it is rotated. A doctor blade 28 is provided to remove excess adhesive from the surface of the cylinder prior to its contact with the paper web 15. The smooth surface of the cylinder is wiped free of adhesive and the excess of adhesive is removed from the etched portion. A resilient surface pressure roller 30 cooperates with the applicator roll so that adhesive is transferred from the applicator roll to the web 15 in a pattern of stripes 31 (see FIG. 2). It should be understood that the adhesive pattern can be any desired configuration as to width of the bands and spacing, but in the embodiment described herein, the strips of foil are generally of the same width and are equally spaced across the paper webs.

A second web 32 from the paper roll 18 follows a path defined by idler rollers 34 and passes through a second adhesive applicator station 36 which is similar to the applicator station 22. The only difference in the applicator 36 and applicator 22 would be in its lateral position with respect to the anvil or ledger cylinder 38 and the pattern of circumferential smooth and etched bands on the applicator cylinder 40. In this preferred embodiment with only two pick-up or contact points or locations on the anvil 38, the pattern of the bands on cylinder 40 would be opposite to those on cylinder 26. For example, where there is a smooth band on cylinder 26, there would be an etched band on cylinder 40 and vice versa. Therefore, the adhesive stripes on web 32 are opposite to the adhesive stripes on web 15.

Figure 3:
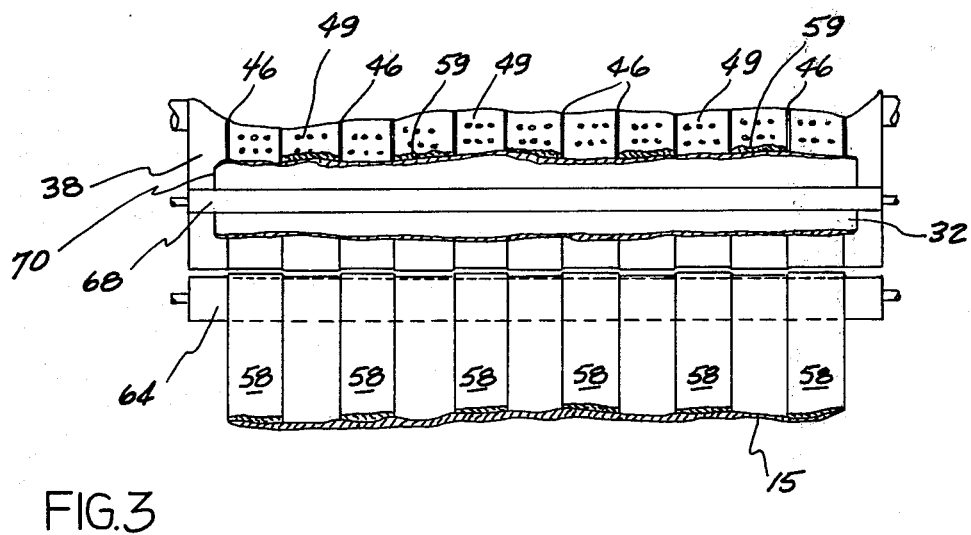
FIG. 3 is a sectional view taken along Line 3—3 of FIG. 1.

The foil web 42 from roll 16 is approximately the same width as the paper webs 15 and 32 and is directed through idler rollers 44 onto an anvil cylinder 38. The anvil cylinder (see FIG. 3) has a plurality of laterally spaced peripheral grooves 46 which cooperate with a plurality of cutting tools 48 such as razor blades, knives, etc., as is known in the art. Other types of cutting devices such as circular cutting wheels can be used; however, if cutting wheels are used, the surface of the anvil cylinder could be smooth as opposed to grooved.

Also in this preferred embodiment, the anvil roll 38 has a plurality of openings in its surface and a negative pressure or suction is applied to the surface of the anvil through openings 49 to hold the foil web 42 on the surface of the anvil through the use of vacuum system 50 as is well known in the art. The vacuum can be applied to the cylinder continuously or it can be applied from the point of contact 52 of web 42 to the anvil until the paper web 32 contacts the surface of the anvil at 54. Other alternative methods such as electrical or electrostatic means can be used and may be preferred on other types of materials. In certain instances, the holding means might be eliminated and, although it is preferred, it might not be essential.

Turning again to FIG. 1, the foil web 42 contacts the anvil cylinder 38 at 52. The anvil rotates in a clockwise direction and the foil progresses around the cylinder and is slit to strips 58 and 59 (see FIG. 2) by knives 48. As the strips continue to rotate with the anvil, they are contacted at 60 by web 15 having adhesive stripes 31. A combining impression roll 64 nips the strips 58 to the web 15 to make a composite web 66 including strips 58 and web 15. The strips 59 continue on the anvil and are not affected by the first nipping operation since no adhesive is on web 15 at their location.

Web 32 having the alternate pattern of adhesive stripes contacts the anvil at point 54 through the use of another compressing impression roll 68, thereby forming another composite web 70. Composite webs 66 and 70 are directed through dryers 72 and 74, respectively, onto rewind rolls 76 and 78. Slitter mechanisms 80 as are known in the art are provided to slit the composite webs into desired widths.

The anvil 38 of the strip laminator provides support for the strips 58 and 59 prior to their adherence to webs 15 and 32. There is no unsupported length of the light gauge stripping from the slitting operation to the laminating operation, thereby eliminating the tension problem and parallelism problem which have occurred in the presently used strip laminating processes. Also, the necessity of handling a multitude of narrow rolls can be eliminated since the slitting operation is combined with the laminating operation.

The process can be modified by utilizing paper webs having heat activatable adhesive in selected patterns. A heating element would be provided adjacent the ledger roll 38 near impression rollers 64 and 68 to activate the adhesive prior to its contacting with the strips. In this way, adhesive stations 22 and 36 could be by-passed or eliminated. Furthermore, more than two backing webs can be used and the slitting pattern can easily conform to the use of more backing webs. As many additional backing members could be used as long as the foil strips are maintained against the anvil between the slitting operation and their contact with a backing web.

These and other modifications which will be apparent to those skilled in the art can be made without departing from the scope of the invention as defined in the following claims:

I claim:

1. A method for laminating longitudinal strips to a backing web comprising the steps of:
   (a) providing a first continuously moving web;
   (b) applying a selected pattern of transversely spaced, continuous, longitudinal, adhesive stripes on said first web;
   (c) providing a second continuously moving web;
   (d) moving said second web into contact with an anvil;

(e) severing said second web, longitudinal to its direction of movement, into a plurality of continuous strips;
(f) maintaining said plurality of continuous strips in contact with said anvil; and
(g) contacting the continuous strips while on said anvil with said first web so that selected strips adhere to the continuous adhesive stripes on said first web to form a first composite web.

2. The method of claim 1, further including the steps of:
(a) providing at least a third continuously moving web;
(b) applying a selected pattern of transversely spaced continuous, longitudinal, adhesive stripes on said web; and
(c) contacting the continuous strips which remain in contact with said anvil subsequent to the contact by said first web with said third web so that selected strips adhere to the continuous adhesive stripes of said third web to form a second composite web.

3. The method of claim 1, further including severing the first composite web into desired widths.

4. The method of claim 2, further including severing the second composite web into desired widths.

5. An apparatus for forming a composite web structure having a plurality of continuous transversely spaced strips laminated to a first backing web comprising:
(a) an anvil means for contacting a continuously moving web;
(b) means associated with said anvil means to sever said continuously moving web while said web is in contact with said anvil into a selected number of continuous strips;
(c) means for maintaining said continuous strips in contact with said anvil;
(d) means for applying a selected pattern of transversely spaced, continuous, longitudinal adhesive stripes on said first backing web; and
(e) means for causing said first backing web to contact said continuous strips while said strips are in contact with said anvil, whereby a first group of selected strips adhere to the adhesive stripes on said first backing web to form said composite web.

6. The apparatus of claim 5, further including:
(a) means for applying a selected pattern of transversely spaced, continuous, longitudinal adhesive stripes on a second backing web; and
(b) means for causing said second backing web to contact the remaining strips on said anvil so that a second group of selected strips adhere to the adhesive stripes on said second backing web to form a second composite web.

7. The apparatus of claim 6, wherein said means for maintaining said continuous strips in contact with said anvil include a plurality of rollers associated with said anvil, at least one roller directing said continuously moving web against said anvil prior to said severing means and the remaining rollers contacting said anvil at the point of contact of said first and second backing webs, respectively.

8. An apparatus of claim 6, wherein said means for maintaining said strips in contact with said anvil surface further includes:
(a) a plurality of openings in said anvil surface; and
(b) means for selectively supplying a negative pressure to said openings.

9. An apparatus for laminating a plurality of strips severed from a first web to at least a first and second carrier web to form first and second composite webs comprising:
(a) a frame;
(b) an anvil cylinder carried in said frame;
(c) means for rotating said anvil cylinder;
(d) means for moving said first web into contact with said anvil cylinder so that said first web rotates with said anvil cylinder;
(e) means for severing said first web into a plurality of strips;
(f) means for maintaining said strips in contact with said anvil cylinder after said first web has been severed;
(g) applicator means for applying a striped adhesive pattern to said first and second carrier webs;
(h) means for causing a first carrier web to contact said anvil cylinder after said adhesive has been applied to said first carrier web and after said first web has been severed so that selected strips adhere to the adhesive stripes of said first carrier web;
(i) means for causing a second carrier web to contact said anvil cylinder after said adhesive has been applied to said second carrier web and after said first carrier web has contacted said anvil cylinder so that selected strips adhere to said second carrier web; and
(j) means for winding said first and second composite webs.

10. The apparatus of claim 9, further including means for slitting said first and second composite webs into desired widths prior to winding.

* * * * *